Patented Oct. 9, 1923.

1,469,812

UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER SOLVENT AND COMPOSITION.

No Drawing.   Application filed April 1, 1921.   Serial No. 457,721.

*To all whom it may concern:*

Be it known that I, STEWART J. CARROLL, a citizen of the United States of America, residing at Rochester, in the county of Monroe and State of New York, have invented certain new and useful Improvements in Cellulose-Ether Solvents and Compositions, of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible, transparent film on the machines and by the methods now in use.

In U. S. Patent No. 1,188,376, Lilienfeld, June 20, 1916, there are disclosed a series of alkyl ethers of cellulose. Certain of these are practically insoluble in water, and my invention relates, but is not limited, to the ethers having that property. While the ethers form thin solutions in the lower monohydroxy aliphatic alcohols and in certain aliphatic ketones, it has been found that such single solvents by themselves do not dissolve a sufficient proportion of the ethers to make a desirably thick flowable composition or dope, such as may be used in the manufacture of photographic film base, for instance, by customary methods, or in the other plastic arts.

I have discovered that an adequately strong and useful solvent may be prepared by mixing one or more of the lower aliphatic ketones having more than 3 carbon atoms with one or more of the lower monohydroxy aliphatic alcohols. By the latter term I include the members of the series having less than six carbon atoms. As a few examples of such ketones, I may mention methyl ethyl ketone, methyl propyl ketone, methyl butyl ketone, methyl amyl ketone, diethyl ketone, dipropyl ketone, diisopropyl ketone, dibutyl ketone, diamyl ketone, etc. Generally I use a mixture of these ketones, such being found commercially in the so-called acetone oils. By way of illustration, I may mix equal parts by weight of acetone oil and methyl or ethyl alcohol or a mixture of them.

While the amount of ether that may be dissolved in such mixed or compound solvents may be varied as desired over a large range, it is noted, for the sake of example, that 1 part by weight of water-insoluble ethyl cellulose when dissolved in 5 parts of one of the above compound solvents yields a thick viscous flowable solution.

Other substances which impart additional suppleness, or incombustibility, or other qualities, to the film may also be added to the dope, such, for instance, as triphenyl or tricresyl phosphate, camphor, etc. Since the acetone oil contains several ketones of relatively higher boiling point and correspondingly lower volatility, such ketones remain in considerable amounts in the film when the more volatile lower ketones and alcohols evaporate. The ketones remaining in the film impart useful properties to it.

The ingredients are of the ordinary commercial type and sufficiently purified for the process of film manufacture, so as to give a dope yielding films having the proper relative freedom from color. The viscous-flowable dope above described can be used in connection with the usual film-forming apparatus without the necessity of expensive alterations in the latter.

Having thus described my invention, what I claim as new and desire to secure by Letters Patent is:

1. A composition of matter, comprising cellulose ether, a aliphatic ketone containing more than 3 carbon atoms, and a lower monohydroxy aliphatic alcohol.

2. A viscous flowable composition, comprising an alkyl ether of cellulose dissolved in a solvent containing approximately equal parts by weight of acetone oil and a lower monohydroxy aliphatic alcohol.

3. A composition of matter, comprising water-insoluble ethyl cellulose, acetone oil and methyl alcohol.

4. A composition of matter, comprising cellulose ether and a aliphatic ketone containing more than 3 carbon atoms.

5. A composition of matter, comprising cellulose ether and acetone oil.

6. As an article of manufacture, a flowed or deposited film, comprising cellulose ether and a aliphatic ketone containing more than 3 carbon atoms.

7. As an article of manufacture, a flowed or deposited flexible transparent film, comprising a water-insoluble ether of cellulose and acetone oil.

Signed at Rochester, New York, this 26th day of March, 1921.

STEWART J. CARROLL.